US011597305B2

(12) United States Patent
Hu et al.

(10) Patent No.: US 11,597,305 B2
(45) Date of Patent: Mar. 7, 2023

(54) FOLDING SEAT ASSEMBLY

(71) Applicant: LEAR CORPORATION, Southfield, MI (US)

(72) Inventors: Zhiqiang Hu, Shanghai (CN); Suhua Zhou, Shanghai (CN); Tao Yin, Shanghai (CN); Jianliang Ma, Shanghai (CN)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 17/320,408

(22) Filed: May 14, 2021

(65) Prior Publication Data

US 2021/0354602 A1 Nov. 18, 2021

(30) Foreign Application Priority Data

May 15, 2020 (CN) .......................... 202010414924.1

(51) Int. Cl.
*B60N 2/30* (2006.01)
(52) U.S. Cl.
CPC ............ *B60N 2/3011* (2013.01); *B60N 2/309* (2013.01); *B60N 2/3056* (2013.01); *B60N 2/3093* (2013.01)
(58) Field of Classification Search
CPC .... B60N 2/3011; B60N 2/3056; B60N 2/309; B60N 2/3093
USPC ....................................................... 297/344.1
See application file for complete search history.

(56) References Cited

U.S. PATENT DOCUMENTS

| 4,634,180 A * | 1/1987 | Zaveri ..................... B60N 2/123 297/367 R |
| 5,364,152 A * | 11/1994 | Mastrangelo .......... B60N 2/305 296/65.09 |
| 5,695,247 A * | 12/1997 | Premji ...................... B60N 2/12 297/341 |
| 5,711,505 A * | 1/1998 | Nemoto ............. B60N 2/01516 297/331 |
| 6,250,704 B1 | 6/2001 | Garrido |

(Continued)

FOREIGN PATENT DOCUMENTS

| CN | 102905934 A | 1/2013 |
| DE | 112010003328 B4 | 1/2017 |

OTHER PUBLICATIONS

Office Action for German Application No. 112021112012.8, dated Jul. 22, 2022, 10 Pages.

(Continued)

*Primary Examiner* — Mark R Wendell
(74) *Attorney, Agent, or Firm* — Brooks Kushman P.C.

(57) ABSTRACT

A vehicle seat is provided having a track assembly to allow a seat bottom to slide in a fore-aft direction. A lock assembly is connected to the track assembly and moveable between a locked status and an unlocked status, wherein in the locked status the seat bottom is prevented from sliding, and in the unlocked status, the seat bottom is allowed to slide. A seatback is pivotally connected to the seat bottom. When the seatback is pivoted forward to a first inclined position, the seatback engages and moves the lock assembly to the unlocked status. In the unlocked status, the seat bottom is biased to slide rearward to a rear storage position. In the rear storage position, the lock assembly is moved to the locked status.

20 Claims, 4 Drawing Sheets

(56) References Cited

U.S. PATENT DOCUMENTS

| | | | |
|---|---|---|---|
| 6,254,188 B1 * | 7/2001 | Downey | B60N 2/123 297/341 |
| 6,439,531 B1 * | 8/2002 | Severini | B60N 2/0887 297/341 |
| 6,733,076 B2 * | 5/2004 | Grable | B60N 2/2352 297/378.12 |
| 6,773,068 B2 | 8/2004 | Shinozaki | |
| 7,090,188 B2 * | 8/2006 | Severini | B60N 2/123 297/341 |
| 7,686,368 B2 * | 3/2010 | Ghergheli | B60N 2/206 296/65.09 |
| 7,686,398 B2 | 3/2010 | Yokoyama | |
| 8,360,497 B2 | 1/2013 | Kokubo et al. | |
| 8,585,145 B2 * | 11/2013 | Nock | B60N 2/12 297/378.12 |
| 8,939,511 B2 | 1/2015 | Majima et al. | |
| 8,967,719 B2 | 3/2015 | Ngiau et al. | |
| 9,868,369 B1 | 1/2018 | Aktas | |
| 2007/0246985 A1 * | 10/2007 | Sahi | B60N 2/1615 297/331 |
| 2011/0127818 A1 * | 6/2011 | Hazlewood | B60N 2/0825 297/341 |
| 2012/0181409 A1 | 7/2012 | Hayahara et al. | |
| 2012/0181833 A1 * | 7/2012 | Nock | B60N 2/12 297/341 |
| 2017/0001546 A1 * | 1/2017 | Keyser | B60N 2/2227 |
| 2017/0166092 A1 | 6/2017 | Ploch et al. | |

OTHER PUBLICATIONS

First Office Action for Chinese Application No. 2020104149241, dated Dec. 30, 2022, 8 Pages.

\* cited by examiner

FOLDING SEAT ASSEMBLY

CROSS-REFERENCE TO RELATED APPLICATION

This application claims foreign priority benefits under 35 U.S.C. § 119(a)-(d) to CN 2020104149241 filed May 15, 2020, the disclosure of which is hereby incorporated by reference in its entirety.

TECHNICAL FIELD

The present disclosure relates to a foldable vehicle seat.

BACKGROUND

A vehicle seat assembly may have a seatback that pivots for entry or storage, such as those disclosed in U.S. Pat. No. 8,585,145 by Lear Corporation.

SUMMARY

According to one embodiment, a vehicle seat is provided having a track assembly to allow a seat bottom to slide in a fore-aft direction. A lock assembly is connected to the track assembly and moveable between a locked status and an unlocked status, wherein in the locked status the seat bottom is prevented from sliding, and in the unlocked status, the seat bottom is allowed to slide. A seatback is pivotally connected to the seat bottom. When the seatback is pivoted forward to a first inclined position, the seatback engages and moves the lock assembly to the unlocked status. In the unlocked status, the seat bottom is biased to slide rearward to a rear storage position. In the rear storage position, the lock assembly is moved to the locked status.

According to one other embodiment, a seat assembly is provided having a track assembly to be mounted in a vehicle. A seat bottom is mounted to the track assembly to slide in a fore-aft direction between a seating position and a rearward storage position. A seatback is coupled to the seat bottom and operable to pivot relative to the seat bottom between at least an upright position and a flat storage position. A lock assembly is connected between the track assembly and the seatback. A handle is in communication with the seatback and operation of the handle causes the seatback to rotate forward to a first storage position. A first cam is attached to the seatback, and at the first inclined storage position the first cam engages and moves the lock assembly to an unlocked status, thereby unlocking the track assembly and allowing the seat bottom to slide in the track assembly. A biasing member is coupled to and biases the seat bottom rearward to a rear storage position when the lock assembly is in the unlocked status. A bracket is fixed relative to the track assembly. As the seat bottom is moved to the rear storage position, the lock assembly contacts the bracket, thereby moving the lock assembly to a locked status and locking the seat bottom in the rear storage position.

According to another embodiment, a method of adjusting a seat assembly is provided. A seatback is pivoted from an upright use position to a first inclined position. A lock assembly connected between the seatback and a track assembly is moved to an unlocked status when the seatback is in the first inclined position. The seat assembly slides rearward along the track assembly. The lock assembly to a locked status when the seat assembly reaches a rear storage position. The seatback pivots from the first inclined position to a storage position.

DETAILED DESCRIPTION

As required, detailed embodiments of the present invention are disclosed herein; however, it is to be understood that the disclosed embodiments are merely exemplary of the invention that may be embodied in various and alternative forms. The Figs. are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
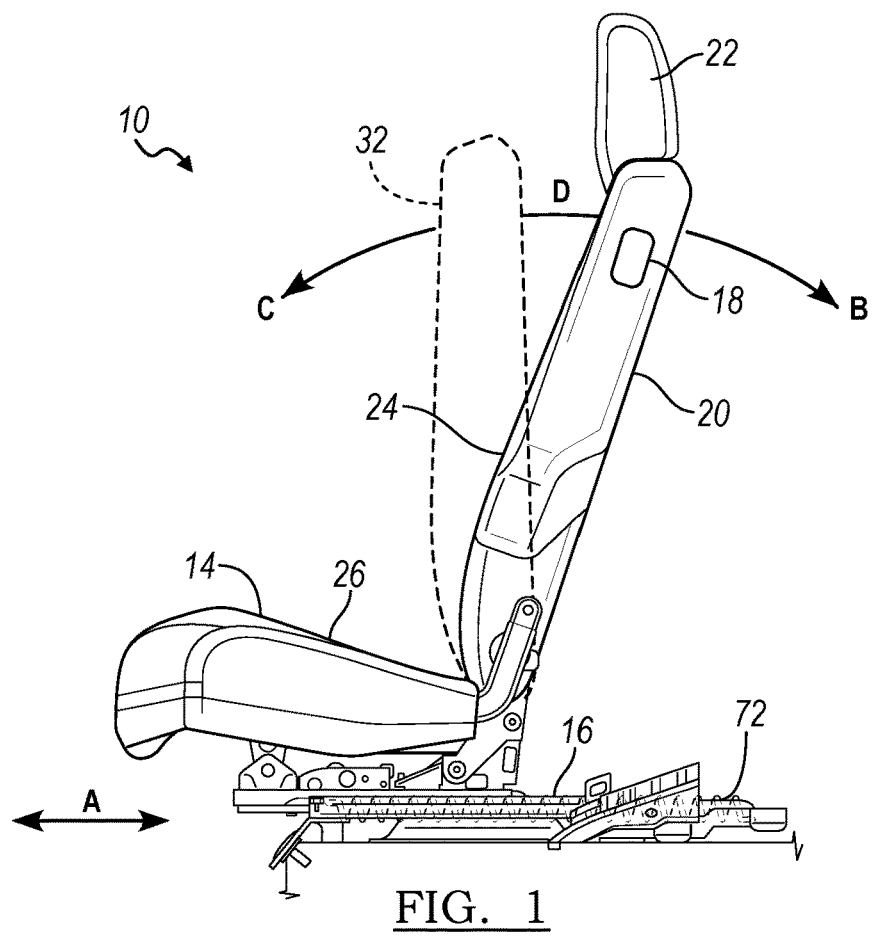
FIG. 1 illustrates a seat assembly according to one embodiment where the seatback is shown in a comfort seating position and being pivoted forward to a first inclined position.

Referring now to FIG. 1, a vehicle seat assembly is illustrated according to an embodiment and is referenced generally by numeral 10. The vehicle seat assembly 10 is adapted to be mounted to a vehicle. The seat assembly includes a seat bottom 14 that is adapted to be adjustably mounted in the vehicle along a track assembly 16 that allows the seat assembly 10 to move in a fore/aft direction A.

A seatback 20 which is adapted to be pivotally connected to the vehicle body adjacent to the seat bottom 14. The seatback 20 may be pivotally connected to the seat bottom 14 by a recline mechanism that can be actuated to pivot the seatback 20 relative to the seat bottom 14. For example, the seatback 20 may be pivoted in the direction of arrow B to recline the seatback 20 rearward at a reclined angle that is a comfort seating position. Of course, the seatback 20 may be positioned in multiple reclined positions at various reclined angles rearward based on the occupant's preferred seated position.

Figure 5:
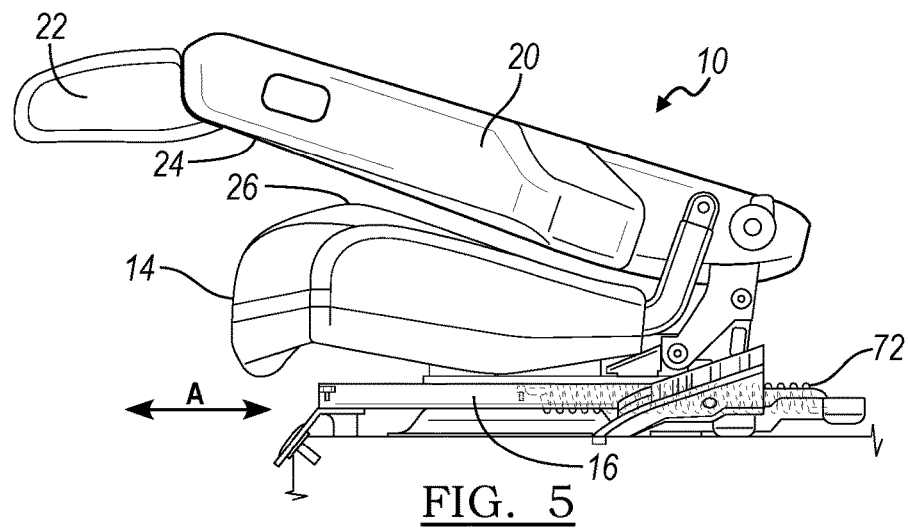
FIG. 5 illustrates the seat assembly of FIG. 1 where the seatback is shown in a folded storage position

The seatback 20 may also be pivoted forward in a direction C to an upright position or to an inclined position where the seatback 20 is inclined forward. The seatback 20 may be pivoted forward to a non-use position, or stowed position, as shown in FIG. 5. An actuator 18, such as a handle, is provided for actuating the seatback 20 to pivot to the reclined/rearward angles or inclined/forward storage positions. The actuator 18 may be located on the seatback 20, or the seat bottom 14, or any suitable location to actuate the pivoting of the seatback 20.

When the seatback 20 is inclined forward, the seatback 20 may not have enough room to fully fold flat. For example, a seat in front of the seat assembly 10 may interfere with the seatback 20 or head restraint 22 as the seat assembly 10 is being folded forward. To enable the seat assembly 10 to be folded forward, it is advantageous if the seat assembly 10 concurrently slides rearward along the track assembly 16, so the seatback 20 and/or head restraint 22 do not interfere with the forward seat and allow the seatback 20 to be folded into a compact storage position. In the compact storage position, the seatback 20 may be pivoted forward so the forward seating surface 24 of the seatback 20 contacts the upward seating surface 26 of the seat bottom 14.

The seat assembly 10 may be a rear seat assembly, such a second row, or third row that is adapted to be moved to a storage position to allow additional cargo space in the vehicle. The seatback 20 may be pivoted forward, or inclined, in a direction C opposite of the comfort seating position where the seatback 20 is reclined. Operation of the recliner handle 18 causes the seatback 20 to rotate forward to a first inclined storage position 32. As shown in FIG. 1, the first inclined position 32 may be only an initial minimal rotation angle D. For example, the initial rotation angle D may be approximately 15-degrees, or any suitable initial forward rotation angle. At the first inclined position 32, a lock assembly 30 is actuated.

Figure 2:
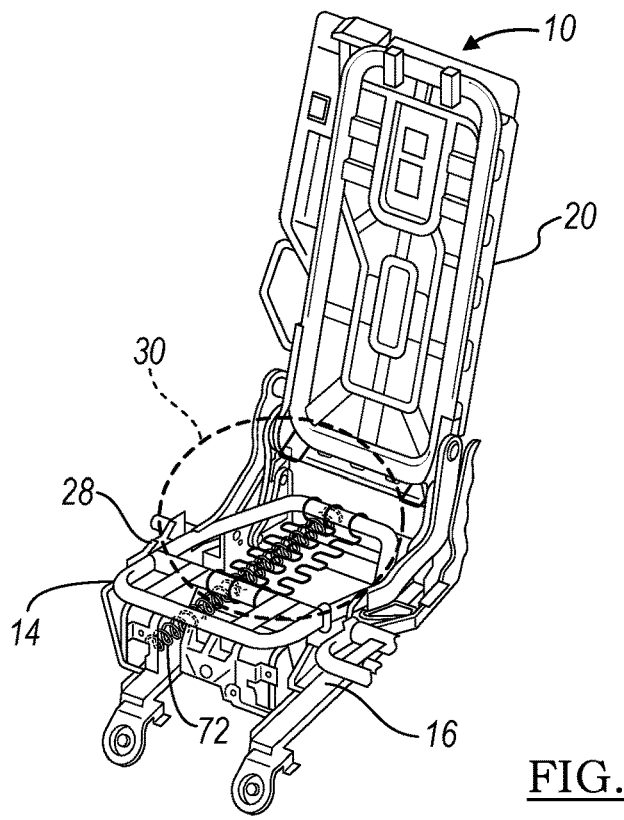
FIG. 2 illustrates the seat assembly of FIG. 1 with a portion removed to show a seat frame and lock assembly.

As shown in FIG. 2, the lock assembly 30 is connected between the track assembly 16 and a frame 28 of the seatback 20. When the seatback 20 rotates forward to the first inclined position 32, the lock assembly 30 is caused to move to an unlocked status to allow the seat bottom 14 to slide in the track assembly 16.

Figure 3:
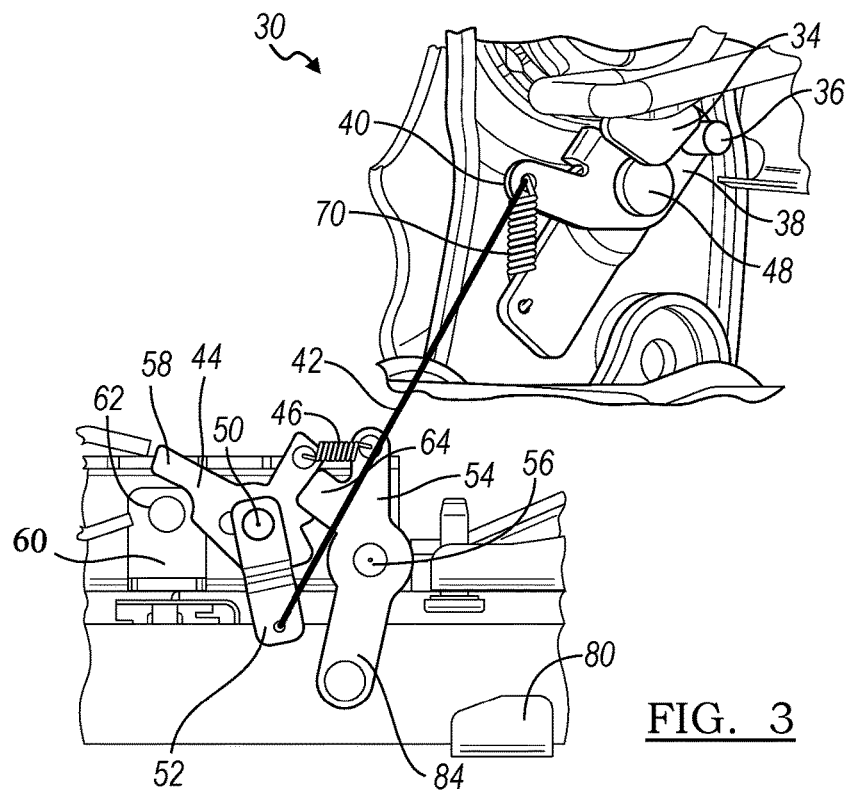
FIG. 3 illustrates the lock assembly in more detail and shown a locked status when the seat is in a forward position.
Figure 4:
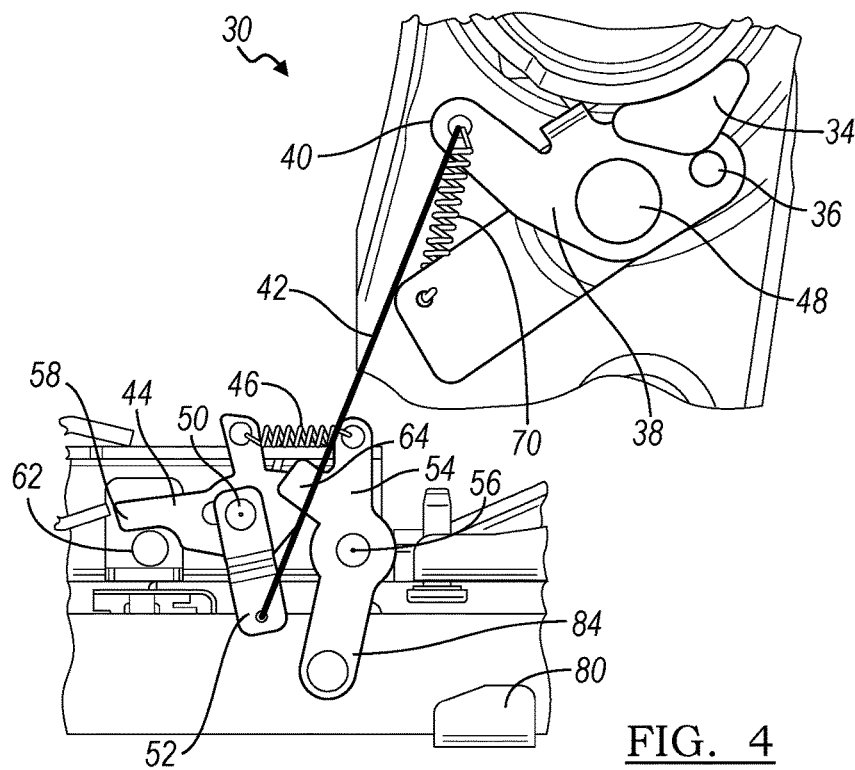
FIG. 4 illustrates the lock assembly in FIG. 3 in an unlocked status.

FIGS. 3-4 show the lock assembly 30 in more detail. In FIG. 3, the lock assembly 30 is shown in a locked status. FIG. 4 illustrates the lock assembly 30 in an unlocked status that allows the track assembly 16 to slide. A first cam 34 is attached to the seatback 20. When the seatback 20 rotates forward to the first inclined position 32, the first cam 34 engages the lock assembly 30 and moves the lock assembly 30 to the unlocked status.

The first cam 34 engages the first linkage 38 of the lock assembly 30 when the seatback 20 rotates forward to the first inclined position 32. The first linkage 38 is mounted to the seatback 20 at a pivot point 48. As the first cam 34 continues to rotate in counterclockwise with the rotation of the seatback 20, the first cam 34 engages a pin 36 on the first linkage 38 and forces the first linkage 38 to pivot and rotate clockwise. The clockwise rotation of the first linkage 38 causes a front edge 40 to move upward which pulls a cable 42 connected to the first linkage 38.

The lock assembly 30 includes a second linkage, or rachet linkage 44, to which the other end of the cable 42 is connected. The rachet linkage 44 is mounted to pivot and rotate at pivot point 50. The cable 42 pulls a lower tab 52 of the rachet linkage 44 in the counter-clockwise direction. The rachet linkage 44 is normally biased in the clockwise direction by a rachet spring 46 connected to a rachet pawl 54 mounted to pivot at pawl pivot point 56.

The lock assembly 30 also includes the release mechanism 60. The release mechanism 60 is connected to the track assembly 16 and prevents the track assembly 16 from sliding when in a locked position, as shown in FIG. 3. The release mechanism 60 is biased up to a locked position, as shown in FIG. 3. The release mechanism 60 is moved down to the unlocked position when the rachet linkage 44 rotates in a counter-clockwise direction. As shown in FIG. 4, as the rachet linkage 44 rotates counterclockwise, a rachet arm 58 of the rachet linkage 44 contacts a pin 62, forcing the release mechanism 60 to the unlocked status.

The seat assembly 10 is able to slide in the track assembly 16 as long as the release mechanism 60 and rachet linkage 44 are held in the unlocked status. The rachet pawl 54 maintains the rachet linkage 44 in the unlocked status. The rachet pawl 54 is constantly pushed counterclockwise by the spring 46 so the rachet pawl 54 is held against rachet linkage 44. Counterclockwise rotation of the rachet linkage 44 also pivots the rachet pawl 54 in the counterclockwise direction. As the rachet 44 linkage and rachet pawl 54 rotate counterclockwise, a pawl finger 64 is moved from a first rachet tooth 66 on the rachet linkage 44, to a second rachet tooth 68. When the pawl finger 64 engages the second rachet tooth 68, the rachet linkage 44 is held in the unlocked status, allowing the seat assembly 10 to slide.

The pawl finger 64 on rachet pawl 54 is retained in the second rachet tooth 68 to keep the track assembly 16 in the unlocked status since the rachet spring 46 is forcing the rachet linkage 44 clockwise and forcing the rachet pawl 54 counterclockwise.

With track assembly 16 in the unlocked status, the entire seat assembly 10 is biased rearward. The seat assembly 10 may be biased rearward by a return spring 72 or other biasing member, or may be moved rearward manually by the operator. The return spring 72 may be connected between the seat bottom 14 and a rear location along the track assembly 16 so that the spring force of the return spring 72 moves the seat assembly 10 to the rear storage assembly when the lock assembly 30 is in the unlocked status.

The seat assembly 10 is adapted to slide rearward along the track assembly 16. As shown in more detail in FIGS. 7-10, the track assembly 16 may include a first track rail 76 and a second track rail 78. The first track rail 76 is adapted to be connected to the seat frame 28 such as the frame of the seat bottom 14. The first track rail 76 is connected to slide relative to the second track rail 78. The second track rail 78 may be mounted to the vehicle and is stationary. The first and second track rails 76, 78 are adapted to slide relative to each other. A person of ordinary skill in the art understands that the track assembly 16 may include other components or configurations that facilitate sliding the seat assembly 10 within the vehicle.

Figure 6:
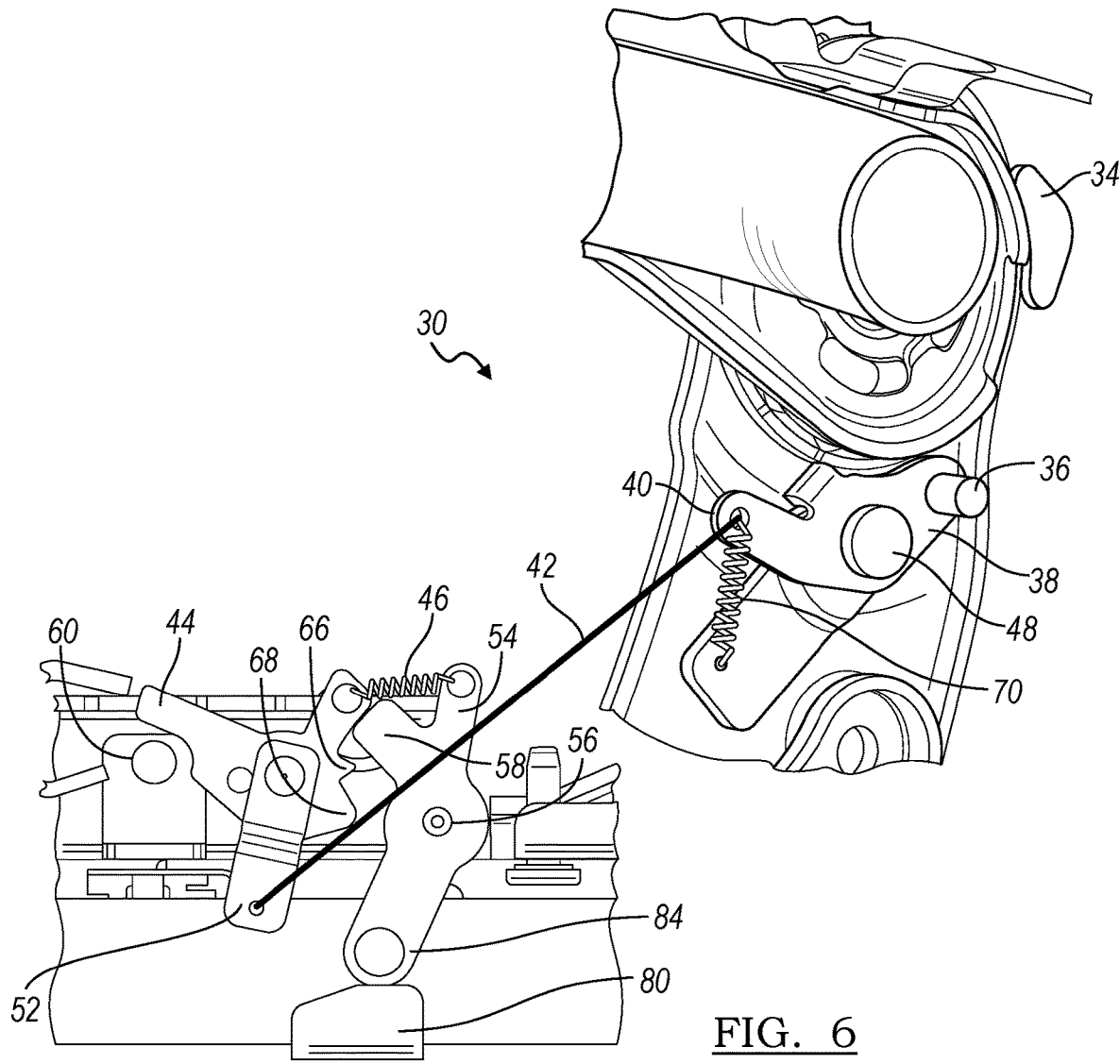
FIG. 6 illustrates the lock assembly shown a locked status when the seat is in a rearward position.
Figure 10:
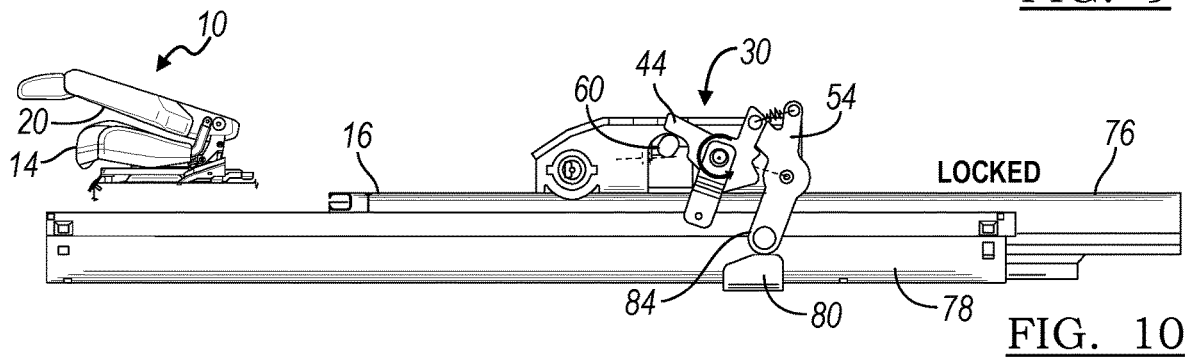
FIG. 10 illustrates the seat assembly in the folded storage position and the corresponding track assembly and portion of the lock assembly in the rearward locked status.

The lock assembly 30 is connected to the seat assembly 10 and moves rearward with the seat assembly 10. A bracket 80 is fixed relative to the second track rail 78 along a rear position. As the seat assembly 10 and lock assembly 30 move rearward, a bottom tab 84 on rachet pawl 54 contacts the bracket 80. As shown in detail in FIG. 6, the tab 84 and rachet pawl 54 are forced clockwise by the bracket 80 and the pawl finger 64 is moved out of second rachet tooth 68 on rachet linkage 44. The rachet linkage 44 is then biased clockwise by the spring 46 which frees the release mechanism 60 to move up to the lock status in FIG. 6. The release mechanism 60 locks the track assembly 16 to keep the seat assembly 10 in a rear storage position, as shown in FIG. 10. With the seat assembly 10 locked in the rear storage position, the seatback 20 can be pivoted and inclined forward to a fully folded storage position.

The seat assembly 10 may be moved back to a seating position where the seatback 20 is reclined in direction B and the seat assembly 10 is moved forward. The first cam 34 rotates with the seatback 20 as the seatback 20 rotates clockwise in direction B. The first cam 34 engages the pin 36 and pivots the first linkage 38 clockwise. The first linkage 38 pulls the cable 42, operating the rachet linkage 44 and release mechanism 60 in the same way shown in FIGS. 3-4 to unlock the track assembly 16. The first linkage 38 may be biased in the counterclockwise direction by a spring 70 to bias the front edge 40 of the first linkage 38 downward when the cam 34 does not engage the first linkage 38.

The rachet pawl 54 is held clockwise by bracket 80, countering the biasing force until the entire seat assembly 10 is slid forward. When the entire seat assembly 10, including the rachet pawl 54 is slid forward, the tab 84 on rachet pawl 54 moves forward of bracket 80, then the ratchet spring 46 forces the rachet pawl 54 and tab 84 counterclockwise which moves the pawl finger 64 into the second rachet tooth 68 on the rachet linkage 44 and sets the track assembly 16 into the unlocked status to allow the seat assembly 10 to be repositioned in the fore-aft direction A.

FIGS. 7-10 show the seat assembly 10 as it dives down from the comfort seating position to the fully folded storage position and how the track assembly 16 and lock assembly 30 move to corresponding locked or unlocked statuses in each of these positions.

Figure 7:
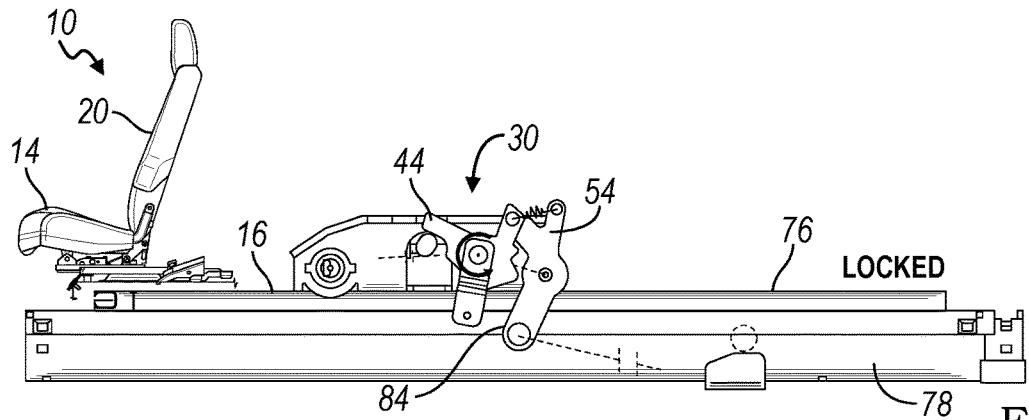
FIG. 7 illustrates the seat assembly in the comfort seating position and the corresponding track assembly and portion of the lock assembly in the forward locked status.

For example, in FIG. 7, the seat assembly 10 is in the comfort seating position. When the seat assembly 10 is in the comfort seating position, the track assembly 16 and the lock assembly 30 are in the forward locked status.

Figure 8:
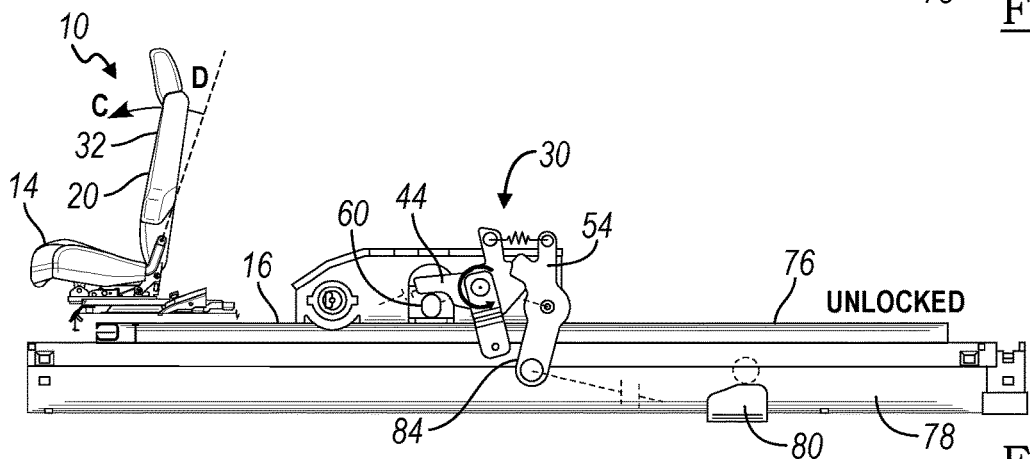
FIG. 8 illustrates the seat assembly in the first inclined position and the corresponding track assembly and portion of the lock assembly in the forward unlocked status.
Figure 9:
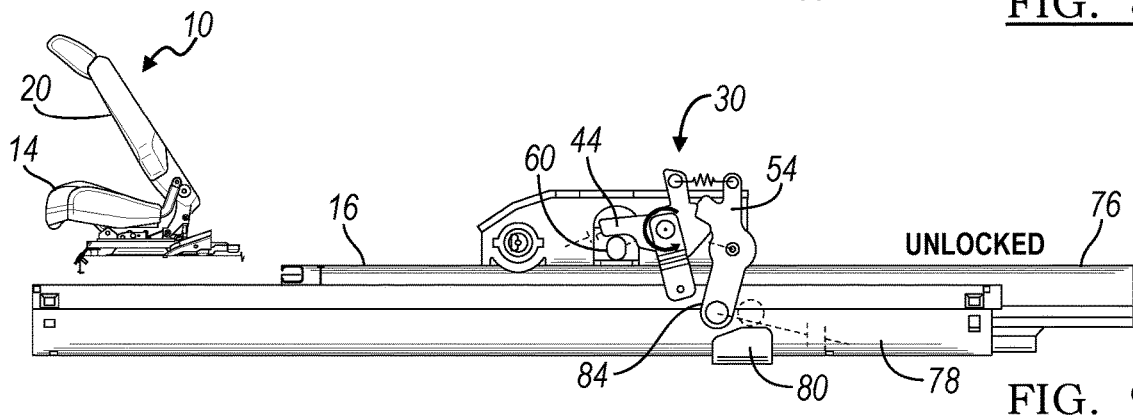
FIG. 9 illustrates the seat assembly in a second inclined position and the corresponding track assembly and portion of the lock assembly in the rearward unlocked status.

As the seat assembly 10 moves to the first inclined position 32 in FIG. 8, the lock assembly 30 is moved to the unlocked status thereby unlocking the track assembly 16. FIG. 9 shows the seat assembly 10 continuing to fold to a second inclined position. The track assembly 16 is unlocked and the lock assembly 30 is able to slide rearward. In FIGS. 8-9, while the lock assembly 30 is in an unlocked status, the seat assembly 10 is able to slide.

Finally, in FIG. 10, the seat assembly 10 reaches the fully folded storage position and the lock assembly 30 slides rearward and is forced to the rear locked status, thereby locking the track assembly 16 and preventing the seat assembly 10 from sliding.

The following is a list of reference numbers:
10 seat assembly
14 seat bottom
16 track assembly
18 actuator
20 seatback
22 head restraint
24 forward seating surface
26 upward seating surface
28 frame
30 lock assembly
32 first inclined position
34 first cam
36 pin
38 first linkage
40 front edge of first linkage
42 cable
44 rachet linkage
46 rachet spring
48 pivot point of first linkage
50 pivot point of rachet linkage
52 lower tab of rachet linkage
54 rachet pawl
56 pawl pivot point
58 rachet arm
60 release mechanism
62 pin on release mechanism
64 pawl finger
66 first rachet tooth
68 second rachet tooth
70 spring
72 return spring
76 first track rail
78 second track rail
80 bracket
84 bottom tab of rachet pawl While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat comprising:
    a track assembly to allow a seat bottom to slide in a fore-aft direction;
    a lock assembly connected to the track assembly and moveable between a locked status and an unlocked status, wherein in the locked status the seat bottom is prevented from sliding, and in the unlocked status, the seat bottom is allowed to slide; and
    a seatback pivotally connected to the seat bottom,
    wherein when the seatback is pivoted forward to a first inclined position, the seatback engages and moves the lock assembly to the unlocked status,
    wherein in the unlocked status, the seat bottom is biased to slide rearward to a rear storage position,
    wherein in the rear storage position, the lock assembly is moved to the locked status,
    further comprising a bracket mounted relative to the track assembly, wherein as the seat bottom slides along the track assembly to the rear storage position, the lock assembly contacts the bracket, thereby moving the lock assembly to the locked status and locking the seat bottom in the rear storage position.

2. The seat assembly of claim 1, wherein when the seatback is moved rearward from a storage position to the first inclined position, the seatback engages the lock assembly to move to the unlocked status, thereby unlocking the track assembly and allowing the seat bottom to slide forward in the track assembly.

3. The vehicle seat of claim 1, further comprising a first cam attached to the seatback, wherein when the seat back pivots to a first inclined storage position, the first cam engages and moves the lock assembly to between the locked and unlocked status.

4. The vehicle seat of claim 3, wherein the lock assembly comprises:
    a first linkage connected to the seatback;
    a second linkage connected to the track assembly; and
    a cable connecting the first and second linkages,
    wherein the first cam engages and moves the first linkage to pull the cable and move the second linkage, thereby moving the lock assembly between the locked and unlocked status.

5. The seat assembly of claim 4, wherein the lock assembly further comprises:
    a release mechanism connected to engage the track assembly and movable to the unlocked status by the second linkage; and
    a pawl mounted to pivot, wherein when the second linkage moves, the pawl engages a tooth on the second linkage, thereby holding the second linkage and the release mechanism to maintain the lock assembly in the unlocked status.

6. The seat assembly of claim 5, wherein the release mechanism is biased to the mechanism lock position to keep the lock assembly in the locked status.

7. The vehicle seat of claim 1, further comprising a biasing member coupled to and biasing the seat bottom rearward to a rear storage position when the lock assembly is in the unlocked status.

8. A seat assembly comprising:
track assembly to be mounted in a vehicle;
a seat bottom mounted to the track assembly to slide in a fore-aft direction between a seating position and a rearward storage position;
a seatback coupled to the seat bottom and operable to pivot relative to the seat bottom between at least an upright position and a flat storage position;
a lock assembly connected between the track assembly and the seatback;
a handle in communication with the seatback, wherein operation of the handle causes the seatback to rotate forward to a first storage position;
a first cam attached to the seatback, wherein at the first inclined storage position the first cam engages and moves the lock assembly to an unlocked status, thereby unlocking the track assembly and allowing the seat bottom to slide in the track assembly;
a biasing member coupled to and biasing the seat bottom rearward to a rear storage position when the lock assembly is in the unlocked status; and
a bracket fixed relative to the track assembly,
wherein as the seat bottom is moved to the rear storage position, the lock assembly contacts the bracket, thereby moving the lock assembly to a locked status and locking the seat bottom in the rear storage position.

9. The seat assembly of claim 8, wherein the seatback is adapted to be folded to a generally flat storage position where a forward seating surface of the seatback abuts an upward seating surface of the seat bottom, wherein the seatback is adapted to be folded to the flat storage position independent of the lock assembly.

10. The seat assembly of claim 8, wherein the lock assembly comprises:
a rachet linkage mounted to pivot and connected to the seatback by a cable, wherein as the seatback pivots to the first inclined position, the cable pivots the rachet linkage from a rachet locked position to a rachet unlocked position;
a release mechanism connected to engage the track assembly and movable between a mechanism locked position and a mechanism unlocked position by the rachet linkage, wherein in the mechanism locked position, the track assembly is prevented from sliding and in the mechanism unlock position the track assembly is able to slide; and
a pawl mounted to pivot, wherein when the rachet linkage moves to the rachet unlocked position, the pawl engages a tooth on the rachet linkage, thereby holding the rachet linkage in the rachet unlocked position, wherein the lock assembly is in the locked status while the rachet linkage and release mechanism are in the locked positions.

11. The seat assembly of claim 10, wherein as the seat bottom is moved to the rear storage position, the pawl contacts the bracket and rotates so the pawl disengages the tooth on the rachet linkage, thereby rotating the rachet linkage to the rachet lock position and moving the release mechanism to the mechanism lock position and locking the seat bottom in the rear storage position.

12. The seat assembly of claim 10, wherein the release mechanism is biased to the mechanism lock position to ensure the seat bottom is locked and unable to slide in the track assembly.

13. The seat assembly of claim 10, wherein the first linkage rotates in a clockwise direction, the rachet linkage rotates in a counter-clockwise direction.

14. The seat assembly of claim 10, wherein the rachet linkage and pawl are biased toward each other and rotate in the same direction.

15. The seat assembly of claim 8, wherein when the seatback is pivoted rearward from the storage position to the first inclined position, the first cam engages the lock assembly to move to the unlocked status, thereby unlocking the track assembly and allowing the seat bottom to be slideable forward in the track assembly.

16. The seat assembly of claim 8, wherein the biasing member comprises a spring.

17. The seat assembly of claim 8, wherein the seat bottom engages the track assembly, wherein when the lock assembly is in the unlocked status, the seat bottom is able to slide rearward with the track assembly from the seating position to the rear storage position.

18. A method of adjusting a seat assembly comprising:
pivoting a seatback from an upright use position to a first inclined position;
moving a lock assembly connected between the seatback and a track assembly to an unlocked status when the seatback is in the first inclined position;
sliding the seat assembly rearward along the track assembly;
moving the lock assembly to a locked status by moving a linkage assembly connected between the seat back and the track assembly when the seat assembly reaches a rear storage position; and
pivoting the seatback from the first inclined position to a storage position.

19. The method of claim 18, further comprising:
pivoting the seatback from the storage position to the first inclined position;
moving the lock assembly to the unlocked status; and
sliding the seat assembly forward to seating position.

20. The method of claim 18, wherein moving the lock assembly between the locked status and the unlocked status comprises moving a first linkage connected to the seatback and moving a second linkage connected to the track assembly, wherein the first and second linkages are connected by a cable.

* * * * *